US012244704B2

(12) United States Patent
Revelle et al.

(10) Patent No.: US 12,244,704 B2
(45) Date of Patent: Mar. 4, 2025

(54) SYSTEMS AND METHODS FOR USE IN NEUTRAL DATA ANALYSIS ACROSS DATA STRUCTURES

(71) Applicant: MASTERCARD INTERNATIONAL INCORPORATED, Purchase, NY (US)

(72) Inventors: Jason Revelle, San Anselmo, CA (US); Cynthia Catherine Hembrock, Lake St. Louis, MO (US); Matt Wickman, O'Fallon, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 228 days.

(21) Appl. No.: 17/977,912

(22) Filed: Oct. 31, 2022

(65) Prior Publication Data

US 2024/0146520 A1 May 2, 2024

(51) Int. Cl.
*H04L 9/08* (2006.01)
*G06F 16/22* (2019.01)

(52) U.S. Cl.
CPC ........ *H04L 9/0866* (2013.01); *G06F 16/2272* (2019.01)

(58) Field of Classification Search
CPC .................................................. G06F 16/2272
See application file for complete search history.

(56) References Cited

U.S. PATENT DOCUMENTS

| 9,571,275 | B1 * | 2/2017 | Pattan | H04L 47/748 |
|---|---|---|---|---|
| 2011/0213807 | A1 * | 9/2011 | Mattsson | H04L 9/0897 |
| | | | | 709/219 |
| 2019/0103963 | A1 * | 4/2019 | He | H04L 9/0861 |
| 2020/0089912 | A1 * | 3/2020 | Mital | H04L 63/0428 |
| 2021/0004488 | A1 * | 1/2021 | Lapushkin | H04L 63/0421 |
| 2021/0117425 | A1 * | 4/2021 | Rao | H04L 41/0806 |
| 2021/0133344 | A1 * | 5/2021 | Cox, Jr. | H04L 9/0894 |

* cited by examiner

*Primary Examiner* — Jonathan A Bui
(74) *Attorney, Agent, or Firm* — Harness, Dickey & Pierce, P.L.C.

(57) ABSTRACT

Systems and methods are described for providing neutral data access across multiple data structures. One example computer-implemented method includes accessing, by a computing device, a first data element in a data structure and assigning a first unique identifier to the first data element. The method also includes replacing, by the computing device, the first data element in the data structure with the first unique identifier, whereby the first data element is removed from the data structure, and encrypting the first unique identifier of the data structure. The method then also includes storing, by the computing device, the data structure, with the encrypted first unique identifier, in a multi-tenant data structure, for access by a data host.

12 Claims, 5 Drawing Sheets

SYSTEMS AND METHODS FOR USE IN NEUTRAL DATA ANALYSIS ACROSS DATA STRUCTURES

FIELD

The present disclosure generally relates to systems and methods for use in neutral data analysis across multiple data structures and, in particular, to systems and methods for use in consolidating data from multiple independently secured data structures into a neutral form, for extended visibility into data analysis.

BACKGROUND

This section provides background information related to the present disclosure which is not necessarily prior art.

It is known for data to be analyzed for a variety of purposes. For example, data across hundreds of thousands or millions of interactions may be assessed to identify patterns of malicious activity (e.g., spyware, fraud, attacks, etc.). In general, the data is accessible according to an agreement with persons associated with the data (e.g., based on data privacy rules, regulations, and agreements, etc.). Parties then employ a variety of different measures to ensure the security of the data, and also compliance with the associated rules, regulations, and agreements.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings. The description and specific examples included herein are intended for purposes of illustration only and are not intended to limit the scope of the present disclosure.

Data is created through user interactions across a variety of different systems (e.g., payment interactions, access interactions, identity interactions, etc.). The data is generally collected consistent with the interactions enabled by each system, such that the data for a single and unique user, or entity, or account, for example, may be represented across multiple systems even in the case that the interactions are intended for a specific and common purpose. For example, an account may receive a deposit for an advance of cash enabled by a processing network (e.g., the MASTERCARD processing network, etc.), and then, that account may be used in a different transaction via a different processing network to debit the account for a purchase of goods, etc. Due to the different processing networks, the data for each interaction is separate, and assessment of data from either processing network individually cannot reveal a holistic view of the account activity represented by the data.

Uniquely, the systems and methods herein permit a neutral joining of the data across multiple data structures (e.g., systems, payment networks, identity platforms, etc.), whereby a more holistic view of the data is available.

Figure 1:
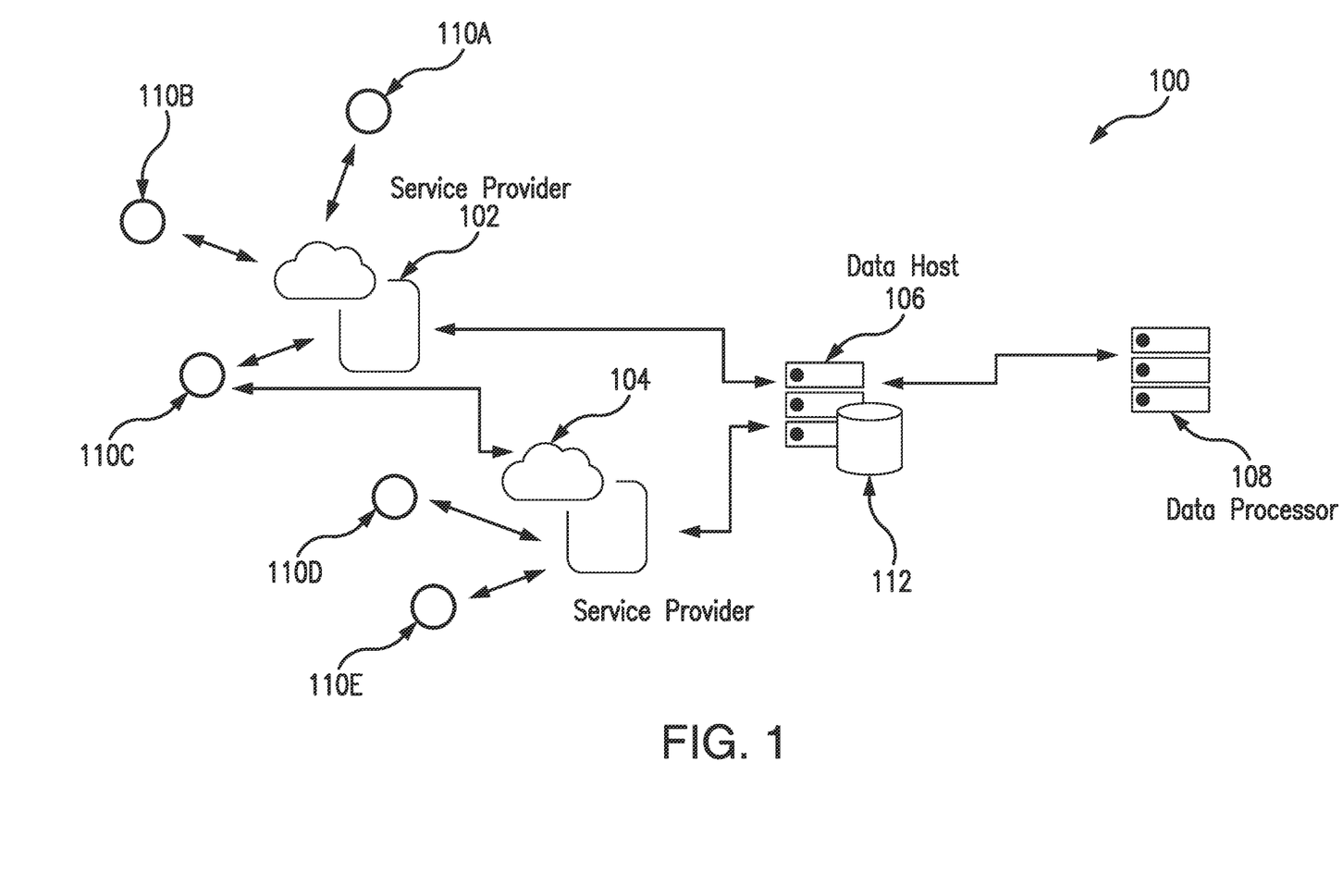
FIG. 1 illustrates an example system of the present disclosure for use in providing neutral data access across multiple data structures.

FIG. 1 illustrates an example system 100 in which one or more aspects of the present disclosure may be implemented. Although parts of the system 100 are presented in one arrangement, it should be appreciated that other example embodiments may include the same or different parts of the system arranged otherwise depending on, for example, types of interactions and/or users, privacy concerns and/or regulations, etc.

As shown in FIG. 1, the illustrated system 100 generally includes a first service provider 102, a second service provider 104, a data host 106, and a data processor 108, each coupled to (and each in communication with) one or more networks, as indicted by the arrowed lines. Each of the one or more networks may include, without limitation, a wired and/or wireless network, a local area network (LAN), a wide area network (WAN) (e.g., the Internet, etc.), a mobile network, and/or another suitable public and/or private network capable of supporting communication among two or more of the illustrated components of the system 100, or any combination thereof. One or more of the networks may further be segregated or separated, whereby, for example, the segregated or separated network(s) may include a private payment transaction network provided by the data host 106 to the providers 102, 104 and the data processor 108, and separately, a public network (e.g., the Internet, etc.) through which the first service provider 102, for example, is permitted to communicate with customers (e.g., banks, etc.), with regard to processing transactions, etc.

In this example embodiment, the first service provider 102 and the second service provider 104 are each service providers associated with financial, identity, and/or access platforms.

For example, each of the providers 102, 104 may include a payment processing network, such as MASTERCARD, VISA, AMERICAN EXPRESS, DISCOVER, etc., whereby each is configured to authorize, clear, and settle payment interactions therethrough. In this example embodiment, the first service provider 102, for example, is configured to receive authorization requests from one or more financial institutions, such as institution 110A of potential institutions 110A-C, etc. The authorization request is specific to a payment account transaction (broadly, interaction), whereby funds are being moved to an account issued by the institution 110A, on behalf of a merchant (e.g., a seller of goods, services, etc.), from an account issued by the institution 110B, on behalf of a consumer. The authorization request may be consistent with the ISO 8583 standard, or other suitable standard, etc. The first service provider 102 is configured to provide the authorization request to the institution 110B, and to receive, in response thereto, an authorization reply and forward the authorization reply back to the institution 110A.

What's more, the first service provider 102 is configured to coordinate clearing and settlement of the payment account transaction, along with hundreds, or thousands of other transactions (or more or less) for a defined interval (e.g., a clearing interval, etc.).

In connection with the above, the first service provider 102 is configured to capture, compile, and store interaction data, which may include account numbers, names, contact information (e.g., address, phone number, email address, etc.), identifiers (e.g., merchant identifiers, acquirer identifiers, etc.), merchant category codes, and other data associated with the interactions and/or necessary to complete the interactions. It should also be appreciated that interactions through the first service provider 102 may include other types of financial transactions, including, for example, real-time payments, ACH transactions, and associated services, etc. In at least one embodiment, the first service provider 102 is configured to coordinate enhanced authentication (e.g., 3DS authentication, etc.), through a directory server, MPI and ACS (not shown), whereby authentication data forms part of the transaction data for the interaction(s). Similarly, the first service provider 102 may further be configured to coordinate chargebacks, disputes, cross-border services, and other associated interactions among the institutions 110A-C.

In connection with the above, the first service provider 102 is configured to capture, compile, and store the data for interactions involving the first service provider 102, whether related to the first service provider 102 as a financial platform, or an identity or access platform. For example, where the first service provider 102 is an identity platform, the data may include, without limitation, names, contact information, government identifiers (e.g., Aadhaar numbers, social security numbers, driver's license numbers, etc.), AAVs, codes, responses, biometrics, account numbers, policies, agreement numbers, employment ID numbers, etc. In this manner, the first service provider 102 is configured to store various forms of personal identifying information (PII) for various customers of the institutions 110A-C, and also potentially for the institutions 110A-C themselves, etc.

It should be appreciated that the second service provider 104 is configured similarly, with regard to institutions 110C-E. As such, the second service provider 104 is configured to store various forms of personal identifying information (PII) for various customers of the institutions 110C-E, and also the PII of the institutions 110C-E themselves, etc.

In this example embodiment, the data host 106 is configured to receive data from each of the first and second service providers 102, 104 and facilitate storing the data in a data structure 112 defined thereby. In particular, the first service provider 102, for example, is configured to encrypt data stored thereby (in whole, or in part) and to share the encrypted data with the data host 106, as a tenant of the data structure 112 defined by the data host 106. The second service provider 104 is also a tenant of the data structure 112 defined by the data host 106 and is similarly configured to encrypt the data stored thereby (in whole, or in part) and to share the encrypted data with the data host 106, as a tenant of the data structure 112 defined by the data host 106. The data structure 112 provides, for example, a shared zone of control among the tenants. The encrypted data from the first service provider 102 is stored in the data structure 112, as is the encrypted data from the second service provider 104. The data is logically separated to limit or eliminate access between the first and second service providers 102, 104 to the other service provider's encrypted data.

The encryption employed by the first service provider 102, for example, may be one-way encryption, whereby the data is encrypted and not decryptable by the data host 106. Other encryption may include asymmetric or symmetric encryption of the data, by the first service provider 102, where encryption keys are not shared (e.g., a service provider defined key, etc.) and the data host 106 is unable, generally, to decrypt the data, as neither tenant provides such keys in any previous or current exchange, and the encryption keys used were unique and private to the tenants. In this manner, the data is obfuscated from the data host 106, thereby preserving confidentiality of the data. Importantly, however, while the data may be generally unrecoverable from the encrypted data by others (e.g., third parties, etc.), the encryption is consistent, whereby the same data will be encrypted into the same encrypted data regardless of time of the encryption (to permit processing as described later).

What's more, in this example embodiment, the encryption may be generally consistent across multiple service providers (e.g., transformed into a common structure, etc.), whereby the general form of the encrypted data is the same despite the data being different (generally) and the encryption key being specific to the service provider, etc.

The encrypted data may further be restricted encrypted data, whereby a portion of the data is restricted out or excluded prior to encryption, and the encrypted data is not representative of all the data in possession of the first service provider 102, in general or per interaction (or group of interactions). That is, the tenant has the ability to decide which data elements should be and should not be encrypted from within their tenancy. For example, it should be appreciated that the encryption of data includes the encryption of data in a data structure, where the data structure is maintained. In one specific example, Table 1 is a data structure, which includes example data. The data structure is a local data structure to the first service provider 102.

TABLE 1

| Record | Name | Phone Number | Time/Date | Account Number |
|--------|------|--------------|-----------|----------------|
| 12345 | John Smith | 111-1111-1111 | Jun. 7, 2022@02:54:56 | 123-456 |

An example encrypted version of Table 1 (and the data included therein) is presented below in Table 2. As shown, the data structure is retained along with the heading labels, etc., whereby the specific data is identifiable as being a particular type and/or category, for example. That said, data contained within the data structure is obfuscated by the encryption, as described above. What's more, the tenant of this data has omitted the phone number data from the encryption, whereby that column of the data is not included in the encrypted data, as shared, as an example of restricted encryption data. As shown, the record identifier is not encrypted as an illustration that some data, optionally, may be included but not encrypted.

TABLE 2

| Record | Name | Time/Date | Account Number |
|--------|------|-----------|----------------|
| 12345 | 6H7864BNDP09 | 5878764BND7908367097M | M6748XV09 |

In connection with the encryption, the first service provider 102 is configured to append a unique identifier to the users included in the data. For example, the user John Smith may be identified by the first service provider 102 as CUSTID_1234, whereby the unique identifier is only linked to John Smith by the first service provider 102, yet interactions related to John Smith each include the CUSTID_1234 identifier. In such an example, the unique identifier may be included in the data, in place of John Smith, whereby in Table 1, above, John Smith would be replaced with CUSTID_1234, thereby allowing CUSTID_1234 to be encrypted and/or sent instead of John Smith. It should be understood that data beyond the name may be replaced, transferred or translated to an identifier, which is then encrypted in place of the actual data.

The second service provider 104 is configured likewise and is generally in possession of a separate or different key, whereby data is encrypted to be obfuscated from the data host 106, thereby preserving confidentiality of the data.

The data host 106, then, is configured as a neutral holder of the encrypted data, whereby data is shared by the first service provider 102, the second service provider 104, and other providers, and maintained, in encrypted form, in the multi-tenant data structure 112, by the data host 106, to provide a more complete data set for interactions across the multiple different providers.

In this example embodiment, the data host 106 is configured to alter the encrypted data. For example, consistent with the above, the data host 106 is configured to append a universal identifier to the first service provider 102, or users included in the data from the first service provider 102 (in lieu of or in addition to the encrypted data from the first service provider 102). For example, the unique identifier CUSTID_1234, from the first service provider 102, may be identified by the data host 106 as PROVID_0987, whereby the universal identifier is only linked to CUSTID_1234 by the data host 106 (and not the data processor 108 or the first service provider 102), yet interactions related to the same each include the PROVID_0987 identifier. Similarly, the name of the first service provider 102 (e.g., ABC Bank, etc.) may be replaced with a unique identifier, such as, PROVID_678, whereby the data provided to the data host 106 from the first service provider 102 is only linked to the first service provider 102 by the identifier known to (and not shared by) the data host 106. Consequently, then, the original identifiers as provided by the first service provider 102 (and the name of the first service provider 102) are omitted from view for the data processor 108, or other similar entities.

In this embodiment, the data host 106 is configured to encrypt (again) the encrypted data and/or unique identifier (while, again, retaining the data structure of the data, as necessary or desired) and to provide the encrypted data to the data processor 108. The data host 106 may be configured to use the same, similar, or different techniques for encryption, as the providers 102, 104, or otherwise. The data structure in Table 3 represents example pre-encryption data at the data host 106, and the data structure of Table 4 illustrates the same data structure after encryption (e.g., example encrypted data, etc.).

In addition to encrypting the data, the data host 106 may be configured to transform the data structure, as necessary or desired, to conform to a common structure, as defined by the data host 106 and/or the data processor 108. In general, the common structure provides for a common format of the data structure with common data and/or common locations, and/or the data structure associated with common labels. For example, the account number column label may be transformed to ACCT #, as defined by a common schema. In this manner, the encrypted data structure from the data host 106 may be consistent for data from the first service provider 102, the second service provider 104, and other service providers, etc., generally regardless of an initial data structure or form of the data.

In this example embodiment, the data host 106 then provides the encrypted data, in the data structure and/or as defined by the unified schema, to the data processor 108.

In turn, the data processor 108 is configured to analyze the encrypted data, across the different providers 102, 104, to link data, for example, to compile feature sets and/or to identify patterns of interactions across the different providers 102, 104 and/or profiles of actors represented by the data, if present. Data is therefore unified and available, but no discoverable (e.g., usable, unencrypted, unprotected, etc.) form of the original identification, attributes, etc., and no distribution of sensitive data is/are available to other providers, processors, or the data host. In this manner, malicious activities spread across the different providers 102, 104 is identifiable, whereby it had not been through conventional techniques. The data processor 108 may be configured to identify the patterns and/or profiles to the data host 106.

In connection with the above, in turn, the data host 106 is configured to generate one or more alert conditions, or to generate scoring for certain interactions, etc., based on the feature sets, profiles and/or patterns and also the encrypted data from the service providers 102, 104, whereby alerts and/or scoring may be based on data across the different service providers, etc. Additionally, or alternatively, the data host 106 may be configured to identify the feature sets, patterns and/or profiles and relay the same to the service providers 102, 104 whereby each may be configured to implement alerts and/or scoring based thereon.

While only two service providers 102, 104, one data host 106, and one data processor 108 are illustrated as part of the system 100 of FIG. 1, it should be appreciated that additional instances of these entities or other entities may be included

TABLE 3

| Provider ID | Record | Name | Time/Date | Account Number |
|---|---|---|---|---|
| PROVID_678 | 12345 | PROVID_0987 | 5878764BND7908367097M | M6748XV09 |

TABLE 4

| Provider ID | Name | Time/Date | Account Number |
|---|---|---|---|
| H6H7864B | NDP09985544FFH | 875JLBDYT08%TH7FF445 | KHSHEB456HJH |

Consistent with the first service provider 102, the data host 106 may be configured to employ restricted encrypted data, whereby certain data is omitted. For example, as shown in Table 4, the record identifier column is omitted by the data host 106.

in other system embodiments. What's more, it should be appreciated that the data host 106 and the data processor 108 may be part of a single entity, yet logically, or physically separate from one another (e.g., in different computer networks, systems, devices, etc.).

Figure 2:
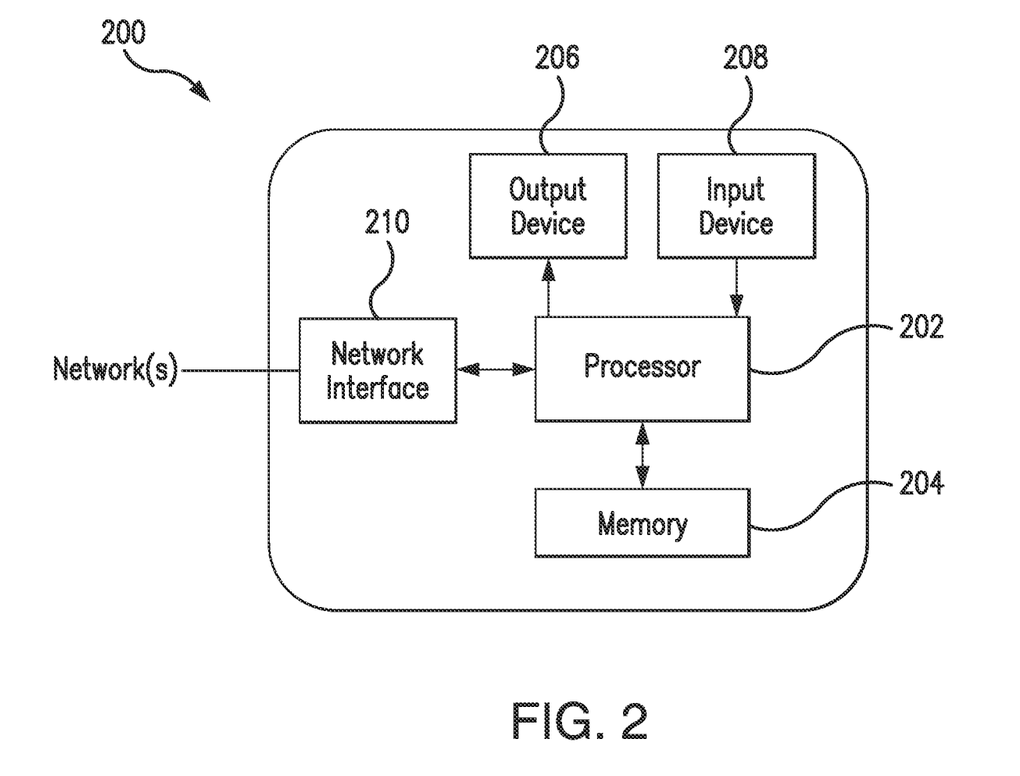
FIG. 2 is a block diagram of an example computing device that may be used in the system of FIG. 1.

FIG. 2 illustrates an example computing device 200 that can be used in the system 100. The computing device 200 may include, for example, one or more servers, workstations, personal computers, laptops, tablets, smartphones, point-of-sale (POS) terminals, payment devices, etc. In addition, the computing device 200 may include a single computing device, or it may include multiple computing devices located in close proximity, or multiple computing devices distributed over a geographic region, so long as the computing devices are specifically configured to function as described herein. In at least one embodiment, the computing device 200 is accessed (for use as described herein) as a cloud-based type computing device. In the system 100, the first service provider 102, the second service provider 104, the data host 106, and the data processor 108 may each include and/or be considered one or more computing devices, which may include or be consistent, in whole or in part, with the computing device 200.

With that said, the system 100 should not be considered to be limited to the computing device 200, as described below, as different computing devices and/or arrangements of computing devices may be used. In addition, different components and/or arrangements of components may be used in other computing devices.

Referring to FIG. 2, the example computing device 200 includes a processor 202 and a memory 204 coupled to (and in communication with) the processor 202. The processor 202 may include one or more processing units (e.g., in a multi-core configuration, etc.). For example, the processor 202 may include, without limitation, a central processing unit (CPU), a microcontroller, a reduced instruction set computer (RISC) processor, an application specific integrated circuit (ASIC), a programmable logic device (PLD), a gate array, and/or any other circuit or processor capable of the functions described herein.

The memory 204, as described herein, is one or more devices that permits data, instructions, etc., to be stored therein and retrieved therefrom. The memory 204 may include one or more computer-readable storage media, such as, without limitation, dynamic random-access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. The memory 204 may be configured to store, without limitation, interaction data, PII, encrypted data, encryption keys, and/or other types of data (and/or data structures) suitable for use as described herein.

Furthermore, in various embodiments, computer-executable instructions may be stored in the memory 204 for execution by the processor 202 to cause the processor 202 to perform one or more of the functions described herein (e.g., one or more of the operations recited in the methods herein, etc.), such that the memory 204 is a physical, tangible, and non-transitory computer readable storage media. Such instructions often improve the efficiencies and/or performance of the processor 202 and/or other computer system components configured to perform one or more of the various operations herein, whereby upon executing such instructions the computing device 200 operates as (or transforms into) a specific-purpose device configured to then effect the features described herein. It should be appreciated that the memory 204 may include a variety of different memories, each implemented in one or more of the functions or processes described herein.

In the example embodiment, the computing device 200 also includes an output device 206 that is coupled to (and that is in communication with) the processor 202. The output device 206 outputs information, audibly or visually, for example, to users associated with any of the entities illustrated in FIG. 1, at a respective computing device, etc. The output device 206 may include, without limitation, a liquid crystal display (LCD), a light-emitting diode (LED) display, an organic LED (OLED) display, an "electronic ink" display, speakers, etc. In some embodiments, the output device 206 may include multiple devices.

In addition, the computing device 200 includes an input device 208 that receives inputs from the user (i.e., user inputs) from users in the system 100, etc. The input device 208 may include a single input device or multiple input devices. The input device 208 is coupled to (and is in communication with) the processor 202 and may include, for example, one or more of: a keyboard, a pointing device, a mouse, a touch sensitive panel (e.g., a touch pad or a touch screen, etc.), another computing device, and/or an audio input device. Further, in various example embodiments, a touch screen, such as that included in a tablet, a smartphone, or similar device, may behave as both the output device 206 and the input device 208.

Further, the illustrated computing device 200 also includes a network interface 210 coupled to (and in communication with) the processor 202 and the memory 204. The network interface 210 may include, without limitation, a wired network adapter, a wireless network adapter, a mobile network adapter, or other device capable of communicating through the one or more networks, and generally, with one or more other computing devices, etc.

Figure 3A:
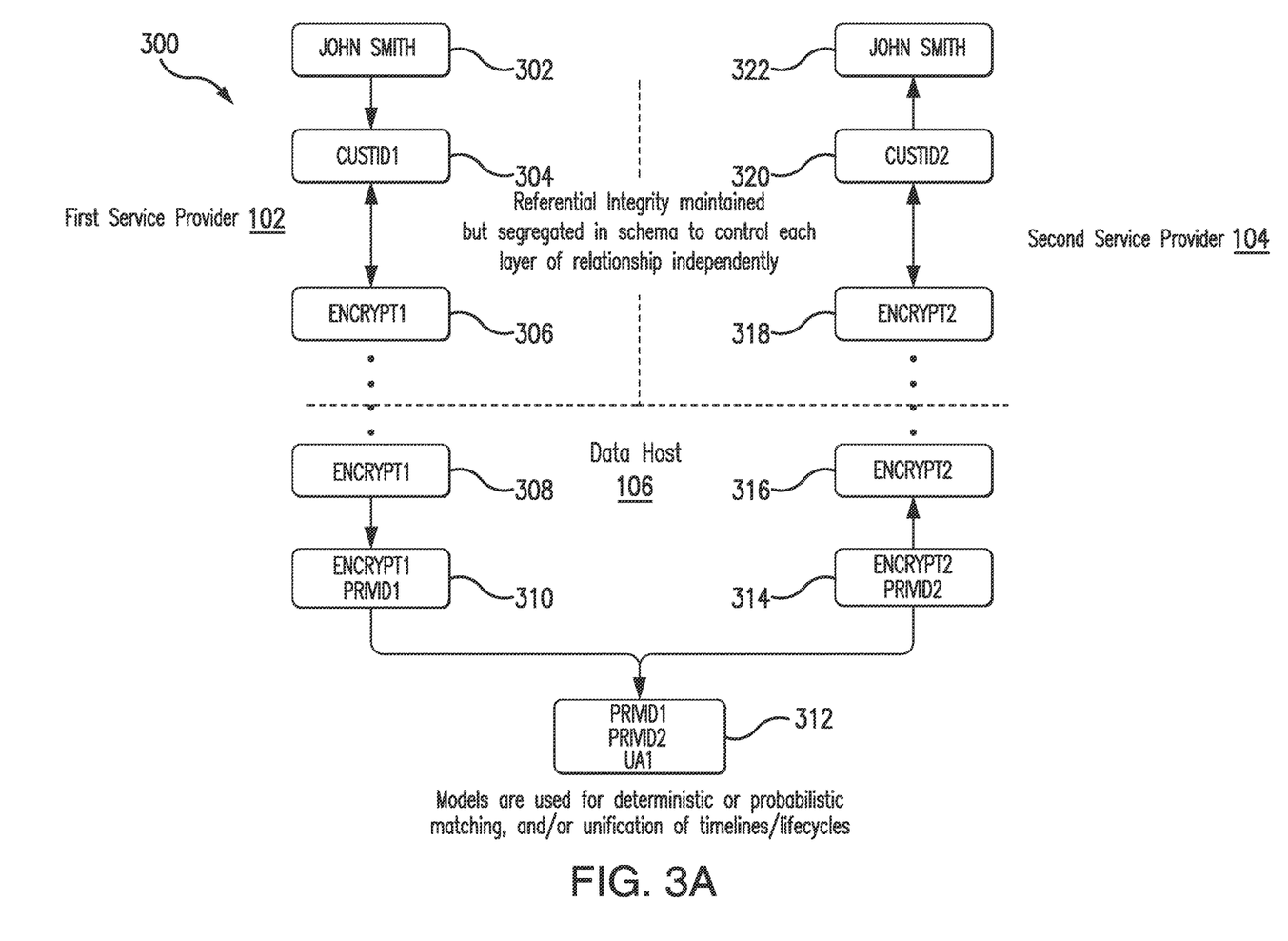
FIG. 3A illustrates an example method that may be implemented via the system of FIG. 1, for use in providing neutral data access across multiple data structures.

FIG. 3A illustrates an example method 300 for use in providing neutral data access across multiple data structures. The example method 300 is described (with reference to FIG. 1) as generally implemented in the data host 106 and the data processor 108 and other parts of the system 100, and with further reference to the computing device 200. As should be appreciated, however, the methods herein should not be understood to be limited to the example system 100 or the example computing device 200, and the systems and the computing devices herein should not be understood to be limited to the example method 300.

At the outset, it should be understood that data associated with different interactions is compiled and stored in and/or by the different service providers 102, 104, through the processing of the interactions, whether related to fund transfers (broadly, financial interactions), identity, access, or otherwise. The data is generally indicative of a particular user, or account associated with the particular user, where the user may be a person (e.g., John Smith, etc.) or entity (e.g., ACME, etc.). The user may also be referred to herein as an actor. It should further be understood that the data, for each actor, may be limited to one service provider, but more often will be across multiple different service providers.

In this example embodiment, the first service provider 102 and the second service provider 104 each possess data, which for simplicity in this example is the name of an actor, John Smith. In general, the data is associated with other data in a data structure whereby the data elements are labeled or otherwise designated, or not. In addition, it should be understood that the customer associated with John Smith, either the actor or an entity associated with the actor, has granted permission to share the data with the data host 106, in general or potentially, subject to one or more privacy techniques, including the method 300, etc.

As shown in FIG. 3A, then, in providing data to the data host 106, the first service provider 102 assigns, at 302, a unique identifier CUSTID1, in the example of FIG. 3A, to the name John Smith, in the data to be provided to the data host 106. In connection therewith, the first service provider 102 essentially replaces "John Smith" with the identifier. In addition, the first service provider 102 compiles and stores in memory a mapping of the unique identifier to the real values, for example, CUSTID1=John Smith, to later permit identifying the underlying data from the unique identifier, etc. What's more, the mapping is not shared outside of the first service provider 102, whereby the identifier is generally not linkable to the underlying data specifically outside of the first service provider 102.

Next, at 304, the first service provider 102 encrypts the data, i.e., CUSTID1, into ENCRYPT1. The encryption may utilize hardware security module (HSM) instances, or cloud development kit (CDK) instances, which in turn employ one or more encryption techniques, etc. The encryption generally includes the transformation of the CUSTID1, based on a key, for example, into a form that is not generally reversible without the specific key by which the data was encrypted. It should be appreciated that various forms of encryption, both key-based, algorithm-based, and otherwise, may be employed.

While only one data element is included in the example herein, for purposes of illustration (i.e., a name (John Smith)), it should be appreciated that the data may include several data elements (e.g., time/date, account number, address, record identifier, bank identifier, currency, address, terminal identifier, etc.) in other method embodiments. In connection therewith, in association with preparing the data to be sent to the data host 106, the first service provider 102 may omit certain data, which is then not communicated to the data host 106 in any form. In this manner, the omission may be based on privacy limitations/agreements, relevance of the data, etc. Additionally, as above, the first service provider 102 may assign unique identifiers to different data, again, potentially, based on privacy limitations/agreements, commonality of the data, etc. And, finally, in this example, the first service provider 102 may encrypt the data (or assigned identifier), or not, prior to sending the data. In general, sensitive identifying data is encrypted, while other non-sensitive or non-identifying data (e.g., a state, city, or record number, etc.) may remain unencrypted when sent to the data host 106, again, based on privacy limitations/agreements between the customer, the first service provider 102, the data host 106 and/or others, etc.

The first service provider 102 then communicates the encrypted data, ENCRYPT1, to the data host 106, at 306. In particular, in this embodiment, the first service provider 102 loads the encrypted data to multi-tenant data structure 112, which is either owned by, controlled by, or accessible to the data host 106. The data host 106, consequently, is then able to access the communicated data, as is the first service provider 102, but the first service provider 102 may be restricted from accessing some or all of the other tenant's data in the data structure 112 (e.g., the second service provider 104, etc.).

The encrypted data, ENCRYPT1, is staged in the data structure 112 and associated with the first service provider 102 as the tenant. At 308, the data host 106 assigns a unique identifier to the data, which is PRIVID1 in this example, whereby PRIVID1 replaces ENCRYPT1 in the data structure 112. The data host 106, consistent with the above, compiles and stores, in memory, a mapping of the unique identifier, PRIVID1, to the real values, ENCRYPT1, to later permit the data host 106 to identify the original data from the first service provider 102, etc. What's more, the mapping is not shared outside of the data host 106, whereby the identifier, PRIVID1, is generally not linkable to the underlying data specifically outside of the data host 106.

The data (i.e., PRIVID1) is in turn transformed, at 310, into a common structure, where each interaction represented in the data is expressed as an event in a common, consistent form. In particular, the data host 106 stores the data shared by the first service provider 102 in a common structure, whereby, for example, the PRIVID1 is populated into a "NAME" data space of the common structure. The common structure may be employed, for example, for purposes such as cybersecurity, through which the data is accessible in the unified model and schema with no additional information/access to/from the data host 106.

It should be appreciated that, in this example embodiment, the PRIVID1 is not encrypted by the data host 106, but in other method embodiments, the PRIVID1 may be encrypted as an additional layer of obfuscation.

The data host 106 then designates the data as available in the data structure 112, whereby the data is accessible to the data processor 108.

In addition to the above, it should be appreciated that, in this example, the name John Smith is also submitted by the second service provider 104 and made accessible by the data host 106 in the same manner. In particular, PRIVID2 is the identifier associated with the ENCRYPT2 from the second service provider 104, which is the encrypted form of the identifier CUSTID2 (which maps back to John Smith).

In connection with the above, at 312, then, the data processor 108 uses models to perform deterministic and/or probabilistic matching and/or unification of timelines/lifecycles, etc., whereby intelligence and insights may be gained from the transformed data (and likely additional data which is either encrypted or not, in this example), related to the potential events across the multiple service providers (e.g., the service providers 102, 104, etc.). In connection therewith, similar patterns or events or matches are assigned a processing identifier, which is unique to the pattern/event/match, which may be based on the PRIVID1 and PRIVID2, alone or more often, in combination with various other data elements in the same events. Specifically, while a single data element (i.e., a name (John Smith)) is used to illustrate the method 300, events having numerous data elements will often be subjected to the method 300, where numerous data elements will be encrypted or replaced by identifiers, etc. As such, as 312, the data processor 108 is permitted to perform a matching and/or unification across the data events, which are properly obscured by the method 300, yet are still representative of the events to form a basis for the matching and/or unification. With continued reference to FIG. 3, in this example, the identifier UA1 is assigned to probabilistic matches between data from multiple different sources, or more specifically, associated with different universal identifiers, PRIVID1 and PRIVID2. The data processor 108 may indicate to the data host 106 when a pattern or timeline or life cycle is indicative of a happening (either good or bad), which is specific to the UA1. The indication to the data host 106 includes the PRIVID1 and PRIVID2, as matched through the UA 1.

In response to the indication from the data processor 108, at 314, the data host 106 associates the intelligence (e.g., features, profiles, patterns, etc.) with the identifiers, PRIVID1 and PRIVID2. For PRIVID2, as shown, the data host 106 then transforms, at 314, the data to a format indicated and/or defined by the second service provider 104 associated with the identifier, and then maps, at 316, the identifier PRIVID2 to the encrypted data, ENCRYPT2. The encrypted data ENCEYPT2 is then communicated to the second service provider 104, along with an indication of the intelligence, or potentially, an indication that further review and/or investigation and/or action may be suggested. In particular, in this embodiment, at 318, the data host 106 stages ENCRYPT2 (and potentially the indication) in the data structure 112, for access by the second service provider 104, and through the data structure 112 or separate therefrom, issues the indication to the second service provider 104.

The second service provider 104 then accesses the data structure 112 and decrypts, at 320, ENCYPTS2 to CUSTID2, using the key or other techniques originally used to encrypt the CUSTID2. The second service provider 104 then maps, at 322, the CUSTID2 to the name John Smith. It should be appreciated that the data host 106 stages the ENCRYPT1 for the first service provider 102 in the same manner, whereby the first service provider 102 decrypts and maps the data into John Smith in a similar manner. Because of the common link of intelligence, it should be appreciated that the first service provider 102 and the second service provider 104 may then communicate or otherwise cooperate to provide shared details about a common happening, which in certain examples, may reveal a larger happening (e.g., criminal event, etc.).

Figure 3B:
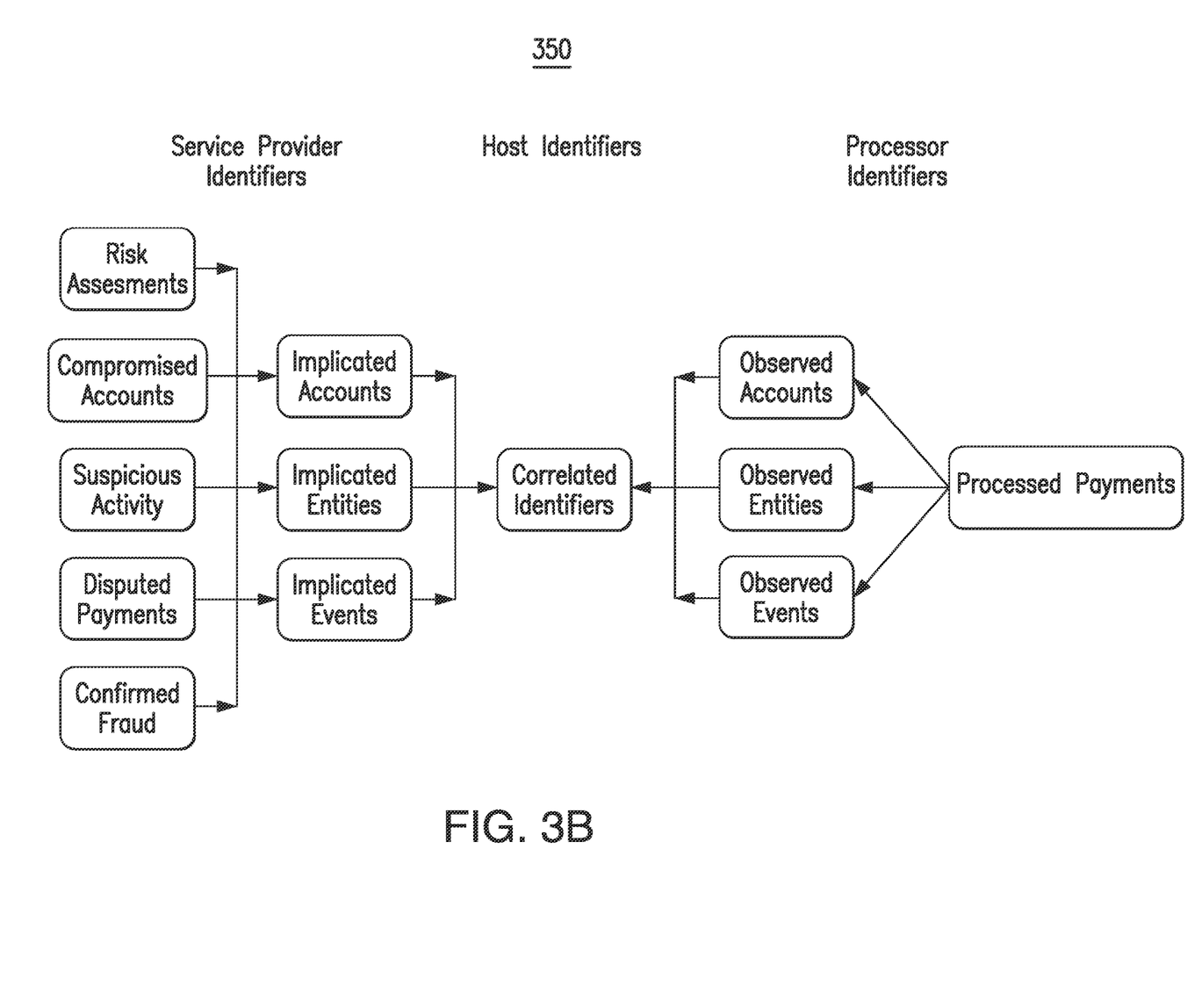
FIG. 3B illustrates an example diagram of data flow, that may be used in connection with the method of FIG. 3A.

In view of the above, it is clear, that the method 300 relies on the specific identifiers associated with the providers, the data host 106 and the data processor 108. In connection therewith, FIG. 3B illustrates a flow diagram 350, which illustrates the different identifiers: the service provider defined identifiers (or the unique identifiers (e.g., CUSTID1, etc.), the data host identifiers (e.g., PRIVID1, etc.) and the data processor identifiers (e.g., UA1, etc.). The flow diagram 350 in FIG. 3B, while example in nature, illustrates use of the identifiers to provide for observed accounts, entities (actors) and events, related to activities, for example, risk assessments, compromised accounts, suspicious activity, disputed payments, confirmed fraud, etc., whereby the data associated with the activities is staged in the data structure 112 by the different service providers 102, 104, for example (e.g., consistent with the method 300, etc.). In this manner, the data host 106 is then able to provide access to the data processor 108, which, in turn, is permitted to perform matching and/or unification of the staged data (e.g., encrypted, mapped data, etc.) in connection with processed payments and observed accounts, entities, and events. The correlation of the identifiers then permits implicated accounts, entities (or actors), and events to be identified to the providers 102, 104, for example. The service providers 102, 104 may then act on the intelligence (expressed, for example, as patterns, profiles, or features) to encourage or inhibit certain activities, etc.

Figure 4:
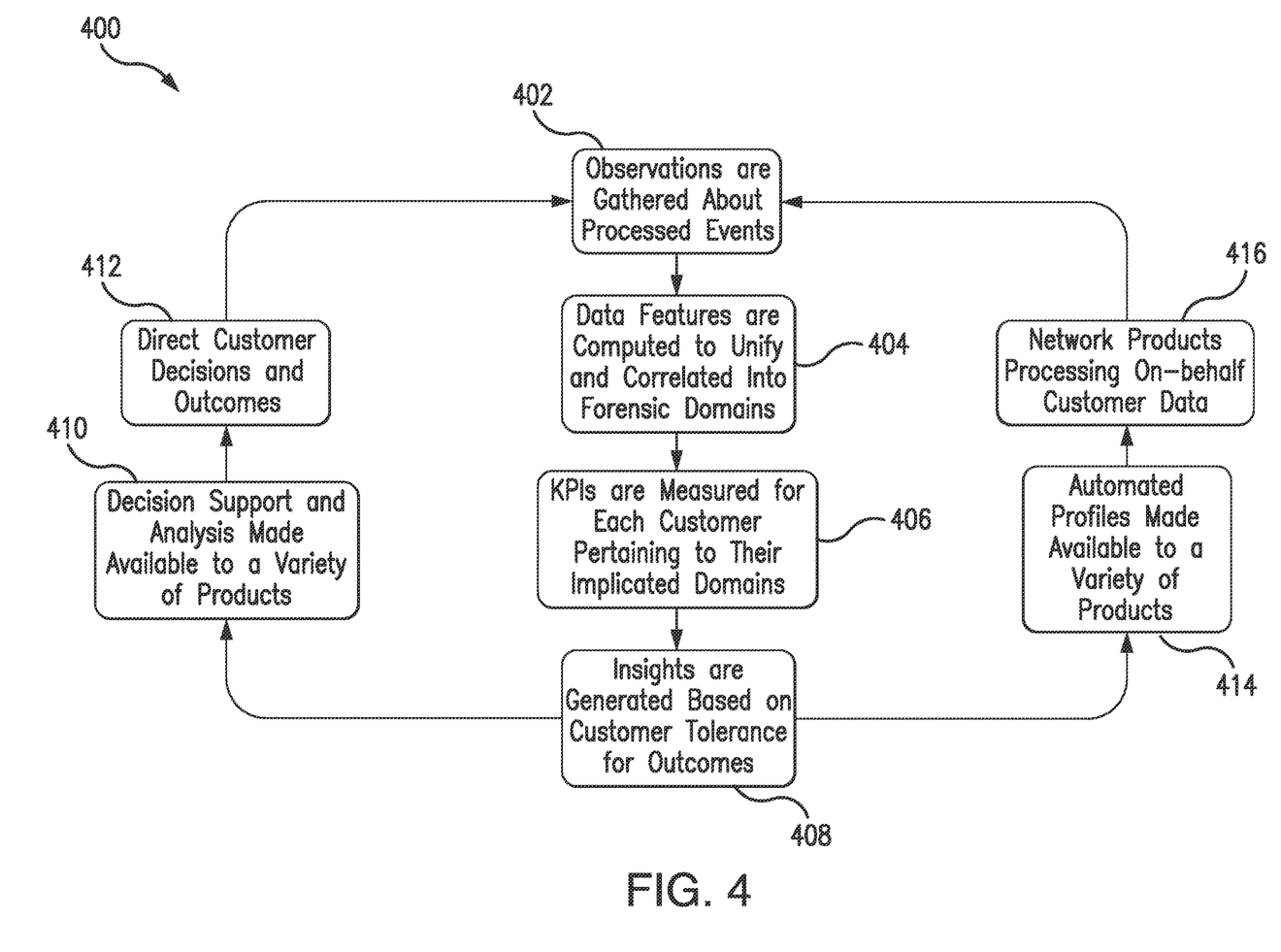
FIG. 4 illustrates an example method that may be implemented via the system of FIG. 1, for use in processing data available through the neutral data access of FIG. 1.

FIG. 4 illustrates an example method 400 for use in building decision support and/or products based on combined data from multiple service providers. The example method 400 is described (with reference to FIG. 1) as generally implemented in the data host 106 and/or the data processor 108 and other parts of the system 100, and with further reference to the computing device 200. As should be appreciated, however, the methods herein should not be understood to be limited to the example system 100 and the example computing device 200, and the systems and the computing devices herein should not be understood to be limited to the example method 400.

At the outset in the method 400, the data sourced from the different service providers 102, 104, etc., is staged into the data structure 112. In response, the data processor 108 gathers, at 402, observations about the events represented by the data. The observations may be associated with a particular account, actor, or event, or combination thereof.

At 404, the data processor 108 computes data features to unify and correlate the different domains of data (e.g., encrypted, mapped data specific to the different service providers 102, 104, etc.), etc. At 406, the data processor 108 defines key performance indicators (KPIs) and then measures the KPIs in the data. The KPIs may be measured for each different customer, as defined by a unique identifier (either encrypted or not) in the data, for each particular domain (e.g., accounts, actors, events, etc.). Insights are then generated, at 408, by the data processor 108 based on the service provider's tolerance for different outcomes based on the KPIs. For example, the first service provider 102 may have a different fraud tolerance than the second service provider 104, whereby the insights may be different for each of the service providers.

Optionally, at 410, the data processor 108 may expose decision support for the service providers 102, 104, for example, whereby different analyses are made relative to the insights, and the data host 106 (or data processor 108) directs decisions and/or outcomes of the service provider 102, for example, based on the same, at 412. Also optionally in the method 400, at 414, the data processor 108 may make automated profiles for inclusion in different products and/or services to the service providers 102, 104, etc. And, at 416, the automated profiles, as products/services, may be permitted to process data from the data structure 112 consistent with the products/services.

In view of the above, the systems and methods herein permit a neutral joining of data across multiple data structures (e.g., platforms, etc.), whereby a more holistic view of the data is available across multiple different service providers (e.g., payment networks, etc.), while maintaining the security of the underlying information, which was previously unavailable.

Again, and as previously described, it should be appreciated that the functions described herein, in some embodiments, may be described in computer executable instructions stored on a computer-readable media, and executable by one or more processors. The computer-readable media is a non-transitory computer-readable storage medium. By way of example, and without limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one of the following operations: (a) accessing a first data element in a data structure; (b) assigning a first unique identifier to the first data element; (c) replacing the first data element in the data structure with the first unique identifier, whereby the first data element is removed from the data structure; (d) encrypting the first unique identifier of the data structure; and (e) storing the data structure, with the encrypted first unique identifier, in a multi-tenant data structure, for access by a data host.

Example embodiments are provided so that this disclosure will be thorough, and will fully convey the scope to those who are skilled in the art. Numerous specific details are set forth, such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" and the phrase "at least one of" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of example embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for use in providing neutral data access, the method comprising:
   accessing, by a computer device, a first data element in a data structure;
   assigning, by the computer device, a first unique identifier to the first data element;
   replacing, by the computer device, the first data element in the data structure with the first unique identifier, whereby the first data element is removed from the data structure;
   encrypting, by the computer device, the first unique identifier of the data structure;
   storing, by the computer device, the data structure, with the encrypted first unique identifier, in a multi-tenant data structure, for access by a data host computer device;
   assigning, by the data host computer device, a second unique identifier to the encrypted first unique identifier; and
   replacing, by the data host computer device, the encrypted first unique identifier in the multi-tenant data structure with the second unique identifier, whereby the encrypted first unique identifier is removed from the multi-tenant data structure, prior to providing access to the second unique identifier in the multi-tenant data structure to a data processor.

2. The computer-implemented method of claim 1, wherein the first data element includes one of a name, a government-issued number and/or an account number for an account issued to a customer.

3. The computer-implemented method of claim 1, wherein the data structure includes multiple data elements, the multiple data elements including the first data element; and
   wherein the method further comprises omitting a second data element of the multiple data elements from the data structure, prior to storing the data structure in the multi-tenant data structure.

4. The computer-implemented method of claim 1, wherein the data structure includes multiple data elements, the multiple data elements including the first data element; and
   wherein the method further comprises encrypting a second data element of the multiple data elements in the data structure, prior to storing the data structure in the multi-tenant data structure.

5. The computer-implemented method of claim 1, wherein encrypting the first unique identifier includes encrypting the first unique identifier based on a key; and
   wherein the method further comprises storing the key in a memory of the computer device to later decrypt the encrypted first unique identifier.

6. The computer-implemented method of claim 1, further comprising storing a map between the first data element and the first unique identifier in a memory of the computer device.

7. A system for use in providing neutral data access, the system comprising:
   a first service provider having a computer device, which is configured, by executable instructions, to, for a local data structure;

assign a first unique identifier to a first data element of the local data structure;
replace the first data element in the local data structure with the first unique identifier, whereby the first data element is removed from the local data structure;
encrypt the first unique identifier; and
store the local data structure, with the encrypted first unique identifier, in a multi-tenant data structure, for access by a data host computer device; and
the data host computer device coupled in communication with the multi-tenant data structure and configured, by second executable instructions, to:
assign a second unique identifier to the encrypted first unique identifier; and
replace the encrypted first unique identifier in the multi-tenant data structure with the second unique identifier, whereby the encrypted first unique identifier is removed from the multi-tenant data structure, prior to providing access to the second unique identifier in the multi-tenant data structure to a data processor.

8. The system of claim 7, wherein the first data element includes one of: a name, a government-issued number or an account number for an account issued to a customer.

9. The system of claim 8, wherein the local data structure includes multiple data elements, the multiple data elements including the first data element; and
wherein the computer device is further configured, by the executable instructions, to omit a second data element of the multiple data elements from the local data structure, prior to storing the local data structure in the multi-tenant data structure.

10. The system of claim 7, wherein the local data structure includes multiple data elements, the multiple data elements including the first data element; and
wherein the computer device is further configured, by the executable instructions, to encrypt a second data element of the multiple data elements, prior to storing the local data structure in the multi-tenant data structure.

11. The system of claim 7, wherein the computer device is configured, by the executable instructions, in order to encrypt the first unique identifier, to encrypt the first unique identifier based on a key; and
wherein the computer device is configured, by the executable instructions, to store the key in a memory of the computer device to later decrypt the encrypted first unique identifier.

12. The system of claim 7, wherein the computer device is further configured, by the executable instructions, to store a map between the first data element and the first unique identifier in a memory of the computer device.

* * * * *